United States Patent
Morgan et al.

[11] Patent Number: 5,834,869
[45] Date of Patent: Nov. 10, 1998

[54] BLOWER MOTOR HOUSING

[75] Inventors: Donald Morgan, Florissant; Nicholas R. Daniels, St. Louis, both of Mo.

[73] Assignee: Emerson Electric Co., St. Louis, Mo.

[21] Appl. No.: 867,626

[22] Filed: Jun. 2, 1997

[51] Int. Cl.[6] .................................................. H02K 5/16
[52] U.S. Cl. ............................................ 310/89; 417/360
[58] Field of Search .............................. 310/89; 417/360, 417/423.15; 431/265

[56] References Cited

U.S. PATENT DOCUMENTS

| | | | |
|---|---|---|---|
| 1,453,495 | 5/1923 | Doble | 431/238 |
| 2,808,525 | 10/1957 | Beckett | 310/89 |
| 3,022,739 | 2/1962 | Herrick et al. | 417/369 |
| 3,220,461 | 11/1965 | Richardson | 431/78 |
| 3,719,843 | 3/1973 | Dochterman | 310/52 |
| 4,126,410 | 11/1978 | Gerwin | 431/265 |
| 4,201,544 | 5/1980 | Brigges et al. | 432/222 |
| 4,499,661 | 2/1985 | Peachee, Jr. | 310/90 X |
| 4,689,511 | 8/1987 | Baker et al. | 310/80 |
| 4,712,997 | 12/1987 | Fullemann et al. | 431/89 |
| 4,740,156 | 4/1988 | Beck et al. | 431/265 |
| 4,841,183 | 6/1989 | Dohogne et al. | 310/90 |
| 4,862,026 | 8/1989 | Riback | 310/90 |
| 4,894,496 | 1/1990 | Palumbo | 310/68 E |
| 4,961,018 | 10/1990 | Akhter | 310/87 |
| 4,998,033 | 3/1991 | Hisabe et al. | 310/67 R |
| 5,076,762 | 12/1991 | Lykes et al. | 310/59 X |
| 5,357,272 | 10/1994 | Watanabe et al. | 310/90 X |

*Primary Examiner*—Nestor Ramirez
*Assistant Examiner*—Judson H. Jones
*Attorney, Agent, or Firm*—Howell & Haferkamp, L.C.

[57] ABSTRACT

A blower motor housing for a fuel burner has a generally "cup" shaped configuration with an open end that communicates with an opening in a side wall of a burner housing. The motor housing is mounted to the burner housing with the open end in register with the opening in the burner housing, thereby joining the interior of the motor housing with the interior of the burner housing. The electric motor is mounted within the motor housing with at least a portion of the stator winding extending axially beyond the open end of the motor housing and into the interior of the burner housing. A squirrel cage blower wheel is mounted to the motor shaft substantially concentric with the stator winding and extends at least partially along the axial length of the stator winding so that, during operation of the burner, cool intake air is moved past the stator winding as it is drawn into the blower wheel.

20 Claims, 4 Drawing Sheets

BLOWER MOTOR HOUSING

BACKGROUND OF THE INVENTION (1) Field Of The Invention

The present invention pertains to a housing for a blower motor of a liquid fuel burner used in heat exchangers, such as furnaces and hot water heaters. More particularly, the present invention pertains to a blower motor housing for a fuel burner that makes use of both the blower motor housing and a portion of the fuel burner housing in enclosing the blower motor and the blower fan.

(2) Description Of The Related Art

Fluid fuel burners, such as oil or gas burners, are well known in the art. The burners are usually used in connection with hot water heaters or furnaces installed in homes and other buildings. The burners use a mixture of air and atomized or gaseous fuel for combustion. Typically, prior art burners include a burner housing, a combustion chamber within the burner housing, a pump for supplying fuel, a blower for providing the necessary combustion air, means for igniting the mixture of the combustion air and fuel, and an electric motor mounted to the burner housing for driving the pump and the blower.

Regardless of the particular configuration, the general function of these burners is similar. Powered by the electric motor, the blower draws combustion air into the burner housing and forces it into the combustion chamber. The pump, also powered by the motor, draws fuel from an external supply source and pumps it to the combustion chamber. Usually, the fuel enters the combustion chamber through a nozzle or some other means for causing atomization or vaporization of liquid fuel or a jet of gas. The mixture of the combustion air and fuel is then ignited by a pair of electrodes, or another suitable means for producing an ignition spark. Finally, the ignited mixture is discharged from the combustion chamber of the burner and into the heat exchanger of the furnace or hot water heater with which the burner is being used.

In prior art burners, the electric motor is comprised of a stator, rotor and shaft cased in a conventional motor housing which is independent from the burner housing. The motor housing is mounted to the exterior of the burner housing. Conventional motor housings include a generally cylindrical section circumscribing the motor and two end shields closing the cylindrical section and thereby defining a fully enclosed motor chamber. The motor shaft is supported for rotation by two bearings, with one bearing being mounted in each end shield of the motor housing at the points where the motor shaft extends out of the stator and the rotor core of the motor. In prior art fuel burners, the interior of the motor chamber is substantially isolated from the interior of the burner housing. The motor shaft extends through one of the end shields of the motor housing, through the side wall of the burner housing, and into the interior of the burner housing where it is coupled to the blower fan.

One obvious purpose of the fully enclosed motor housing is to protect the components of the motor from the outside environment. However, a problem encountered with prior art burners that use electric motors cased in conventional motor housings is overheating of the motors. Because the motor chamber is fully enclosed by the cylindrical section and two end shields, proper ventilation is difficult to achieve. As a result, the components of the motor may overheat during extended periods of continuous operation.

In many prior art fuel burners, the motor housing is mounted with one end shield flush against the side wall of the burner housing. In these burners, the end shield adjacent the burner housing is not necessary for protecting the motor from the outside environment and represents wasted manufacturing cost.

SUMMARY OF THE INVENTION

The above set forth disadvantages of the prior art would be overcome by a burner having a motor housing which provides sufficient bearing support for the motor without substantially restricting ventilation within the motor chamber, which permits increased cooling of the motor during operation, and costs less to manufacture by eliminating unnecessary parts of the motor housing and by reducing the machining that is necessary to manufacture the motor and housing. Another advantage would be provided by the motor housing construction which permits a relatively compact, shorter motor package.

Accordingly, the above-described advantages are achieved by the present invention which provides a housing for a fuel burner blower motor that makes use of both the blower motor housing and a portion of the fuel burner housing in enclosing the blower motor. In contrast to conventional motor housings having a cylindrical outer wall with two end shields, the motor housing used in the present invention has a "cup" shaped configuration. The motor housing has an end wall with an annular periphery, and a generally cylindrical outer wall extending axially from the end wall to form the "cup" shape.

The cylindrical outer wall has an annular distal end opposite the end wall, the distal end defining an opening, i.e., the open end of the "cup." The annular distal end includes a flange configured for mounting the motor housing to a burner housing. Preferably, the flange extends radially outwardly from the cylindrical outer wall of the motor housing at its distal end so as not to interfere with the open end of the motor housing.

An electric motor is mounted within the interior of the motor housing and includes a stator core, a stator winding, a rotor core rotatable within the stator core, and a rotor shaft secured for rotation with the rotor core. The motor housing further includes a cylindrical unit bearing tower of the type shown in U.S. Pat. No. 4,862,026. The unit bearing tower extends axially from a center portion of the housing end wall into the interior of the motor housing substantially concentric with the cylindrical outer wall of the housing. The unit bearing tower includes an axial bore configured to receive at least a portion of the rotor shaft so that the rotor shaft is freely rotatable relative to the motor housing.

Preferably, the housing end wall, the cylindrical outer wall of the motor housing, and the cylindrical unit bearing tower are integrally cast. The cylindrical outer wall may also include on its interior wall an inwardly directed annular step between the end wall and the distal end of the cylindrical outer wall for providing positive axial positioning and support for the stator core within the motor housing.

A side wall of the burner housing is provided with an opening configured to mate with the open end of the motor housing. The motor housing is mounted to the burner housing with the motor housing open end in register with the opening in the side wall of the burner housing, thereby joining the interior of the motor housing with the interior of the burner housing. Mounting the motor housing to the burner housing in this way eliminates the need for one of the motor housing end shields.

The open end of the motor housing and the opening in the side wall of the burner housing are dimensioned to permit air to flow between the interior of the burner housing and the interior of the motor housing. Preferably, the electric motor is mounted within the motor housing with at least a portion of the stator winding extending axially beyond the open end of the motor housing and into the interior of the burner housing and a portion of the rotor shaft extending into the burner housing.

A generally cylindrical "squirrel cage" type blower wheel is mounted substantially concentric with the stator core to the end of the rotor shaft that extends into the burner housing. Rotation of the blower wheel draws outside air through an air intake hood in the burner housing into the center of the blower wheel. The air is then forced radially outwardly from the blower wheel, through a passage in the burner housing, and into a retention tube which serves as the combustion chamber.

The present invention is an improvement over prior art fuel burners in which the interior of the motor housing is substantially isolated from the interior of the burner housing. In the present invention, the blower wheel preferably extends at least partially along the axial length of the stator winding and circumscribes at least a portion of the stator winding. Therefore, during operation of the burner, cool intake air is moved past the stator winding as it is drawn into the center of the blower wheel. Moving cool intake air past the motor results in increased cooling of the motor, and permits longer periods of continuous operation without overheating.

While the principal advantages and features of the present invention have been described above, a more complete and thorough understanding and appreciation for the invention may be attained by referring to the drawings and description of the preferred embodiment which follow.

DETAILED DESCRIPTION OF THE PREFERRED EMBODIMENT

Figure 1:
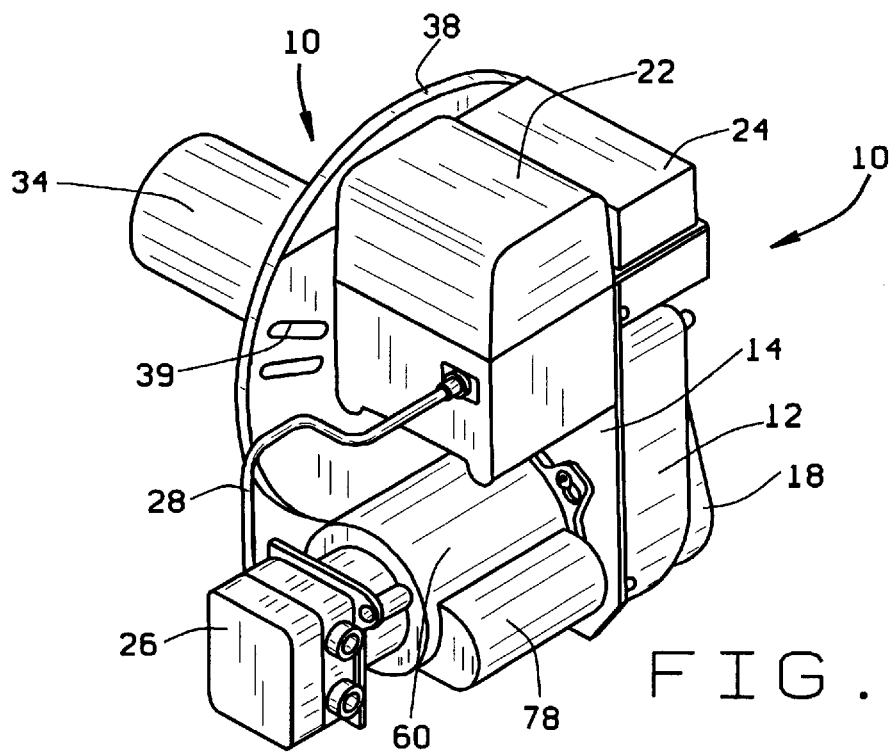
FIG. 1 is an isometric view of a fuel burner employing the blower motor housing of the present invention.
Figure 2:
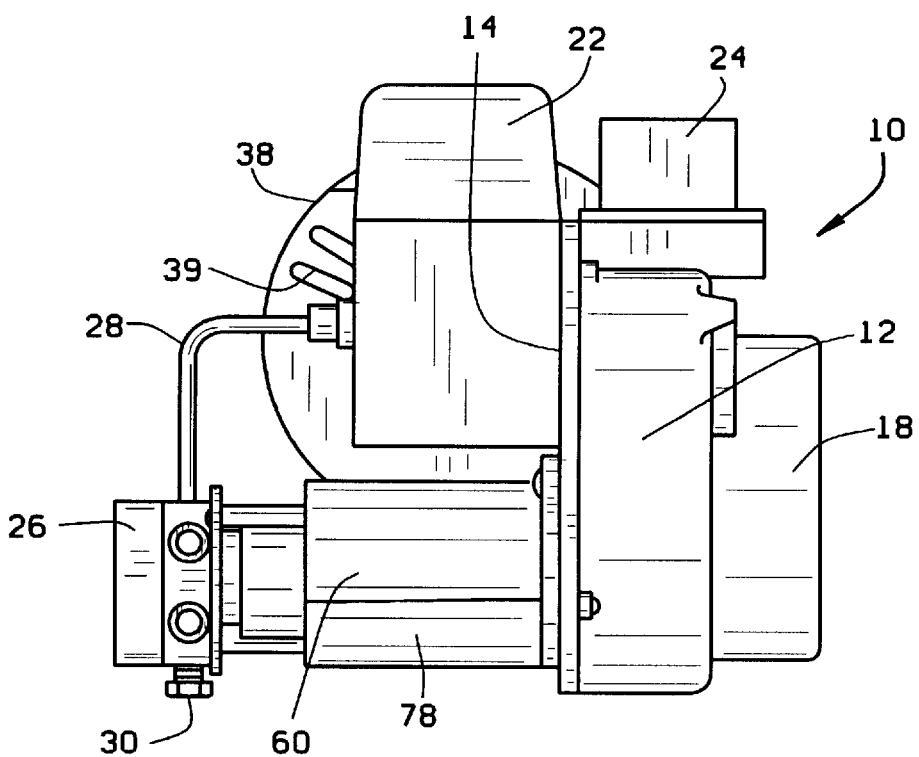
FIG. 2 is a side elevational view of the burner.

The fuel burner is shown generally as 10 in FIGS. 1 and 2. The externally visible components of the burner shown in FIGS. 1 and 2 include a burner housing 12, an air intake hood 18, a transformer 22, a control box 24, a motor housing 60, a fuel pump 26, a fuel line 28 leading from the pump 26 to the burner housing 12, and a retention tube 34 (FIG. 1). The retention tube 34 extends into the burner housing 12 and serves as a combustion chamber.

Figure 3:
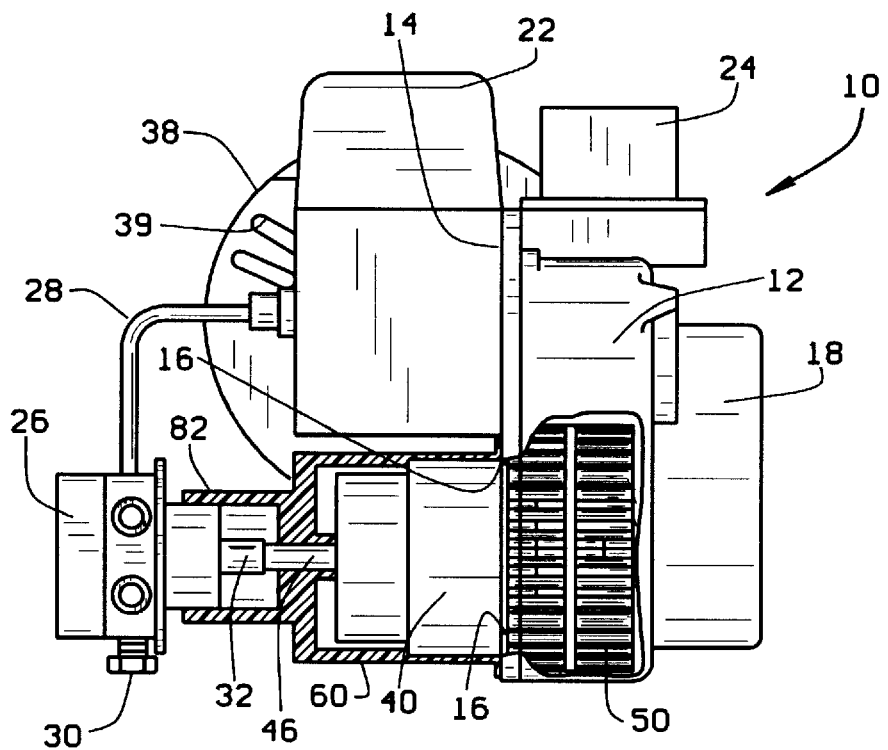
FIG. 3 is a side view, in partial section, of the fuel burner with a portion of the burner housing cut away to show the interior of the motor housing, the motor, and the blower wheel.
Figure 7:
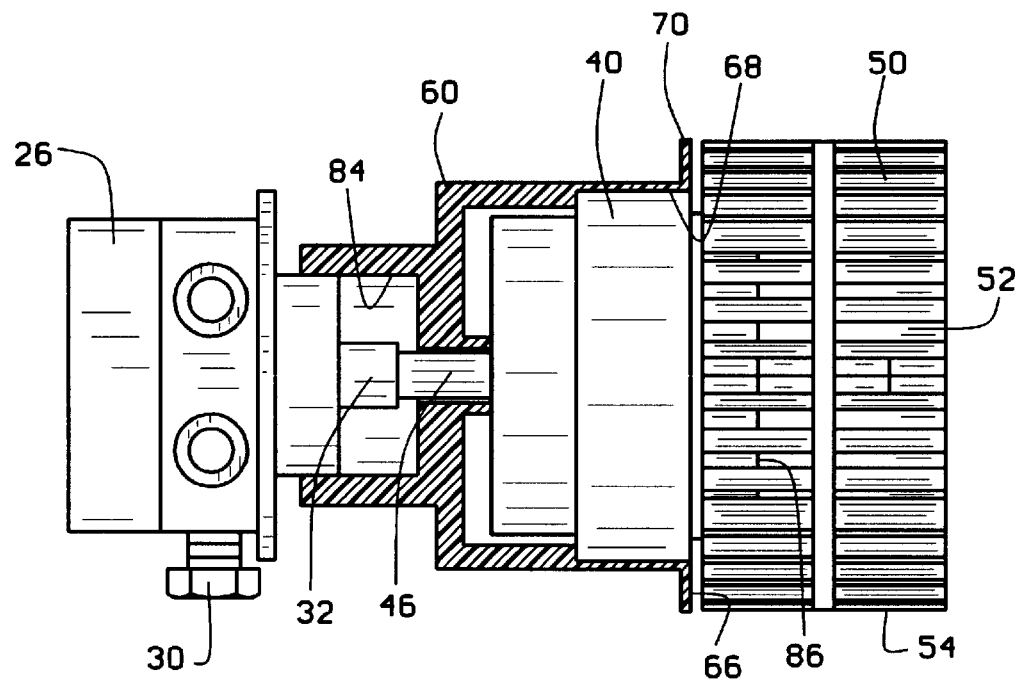
FIG. 7 is a side view of the motor housing, motor, fuel pump, and blower wheel, with the motor housing shown in section.
Figure 8:
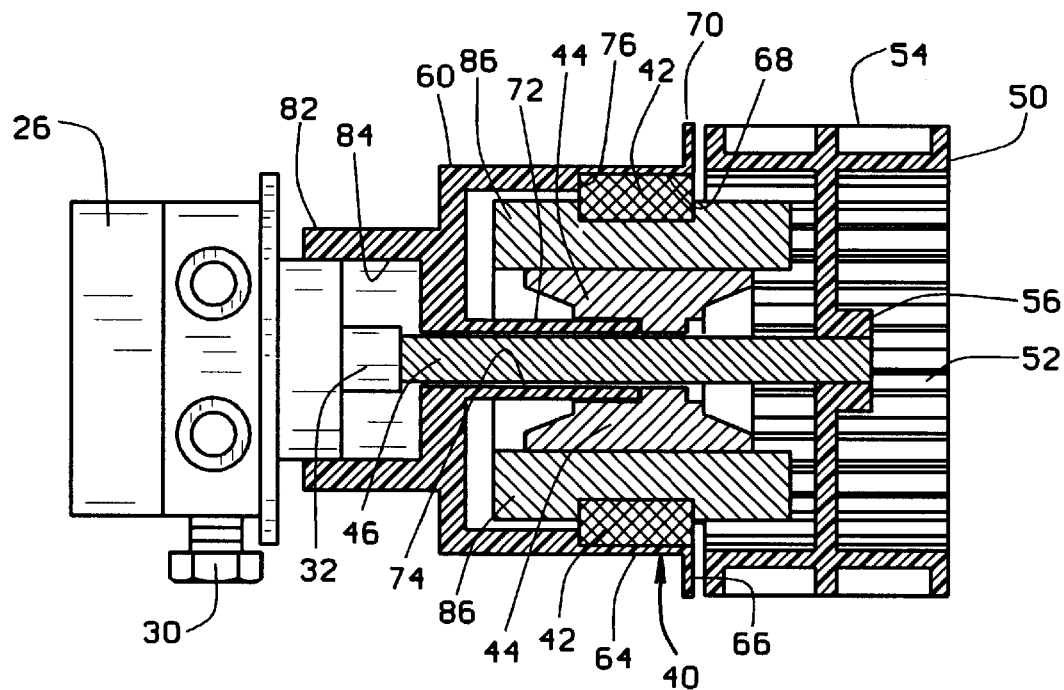
FIG. 8 is a side view, in section, of the motor housing, stator core, stator winding, rotor shaft, rotor core, fuel pump, and blower wheel.

The pump 26 is coupled to the rotor shaft 46 of the electric motor 40 by a coupling 32 (see FIGS. 3, 7 and 8). Driven by the motor 40, the pump 26 draws fuel from an external supply source (not shown) into an inlet port 30 and pumps it to the retention tube 34 (FIG. 1) via the fuel line 28. At the end of the fuel line 28, and mounted within the retention tube 34, is a nozzle assembly (not shown). The fuel exits the fuel line 28 through the nozzle assembly and is injected into the interior of the retention tube 34.

A cylindrical squirrel cage blower wheel 50 is also coupled to the rotor shaft 46 opposite the pump 26 (see FIGS. 3, 7 and 8). The blower wheel 50 is coupled to the rotor shaft 46 by boss 56 (see FIG. 8). The blower wheel 50 draws combustion air into the interior of the burner housing 12 through the air intake hood 18. The air is drawn into the center 52 of the blower wheel 50 and is forced radially outwardly from the periphery 54 of the blower wheel 50. The combustion air is then directed through a passage (not shown) in the burner housing 12 and into the retention tube 34 where it is mixed with the injected fuel.

A pair of electrodes (not shown) are mounted within the retention tube 34 adjacent the nozzle assembly (not shown), and are connected to the transformer 22. An input voltage is "stepped up" by the transformer 22 to a level sufficient to induce an electric arc across the pair of electrodes. The mixture of the combustion air and injected fuel is ignited by the arc and the ignited mixture is discharged from the retention tube 34.

A control system (not shown) is encased in a control box 24 which is mounted to the burner housing 12. The control system is configured to monitor the operation of the burner 10 to ensure that proper combustion is occurring. If a flame failure is detected by the control system, the electric motor 40 will be automatically shut down.

The retention tube 34 leads to the heat exchanger (not shown) of the furnace or hot water heater with which the burner 10 is being used. The retention tube 34 includes a retention head (not shown) at its distal end which causes the ignited mixture to swirl as it is discharged from the retention tube 34 to facilitate complete combustion. The retention tube 34 also includes a mounting flange 38 (FIGS. 1–3). The mounting flange 38 includes a plurality of radial slots 39 around its periphery through which bolts (not shown) connect the burner 10 to the furnace or hot water heater with which the burner is being used.

As shown in FIGS. 3–6, the motor housing 60 has a generally "cup" shaped configuration. The motor housing 60 has an end wall 62 with an annular periphery, and a generally cylindrical outer wall 64 extending axially from the end wall 62 to form the "cup" shape. The cylindrical outer wall 64 has an annular distal end 66 opposite the end wall 62 which defines an opening 68. The annular distal end 66 includes a flange 70 configured for mounting the motor housing 60 to a side wall 14 of the burner housing 12. Preferably, the flange 70 extends radially outwardly from the cylindrical outer wall 64 of the motor housing 60 so as not to interfere with the opening 68.

The electric motor 40 is mounted within the interior of the motor housing 60. As best shown in FIG. 8, the motor 40 includes a stator core 42, a stator winding 86, a rotor core 44 rotatable within the stator core 42 and stator winding 86, and a rotor shaft 46 secured for rotation with the rotor core 44. The motor housing 60 further includes a cylindrical unit bearing tower 72 which extends axially from a center portion of the end wall 62 into the interior of the motor housing 60 substantially concentric with the cylindrical outer wall 64. The unit bearing tower 72 includes an axial bore 74 configured to receive at least a portion of the rotor shaft 46 so that the rotor shaft is freely rotatable relative to the motor housing 60.

Figure 4:
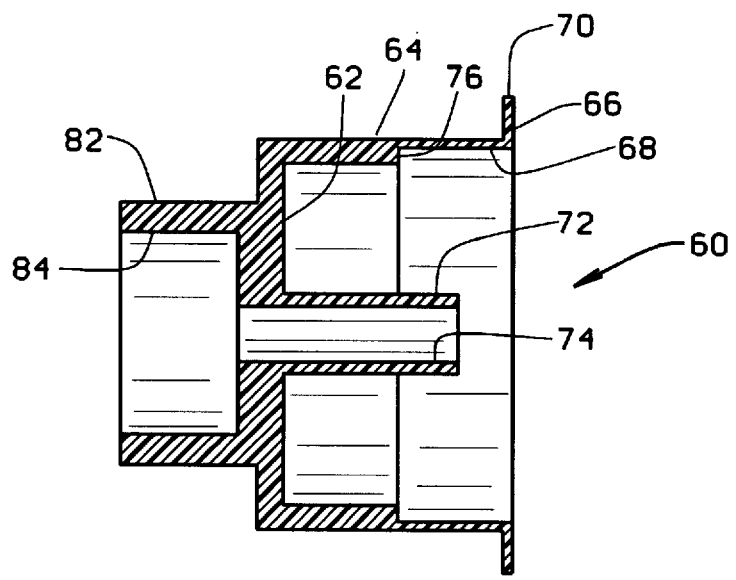
FIG. 4 is a side view, in section, of the motor housing.
Figure 5:
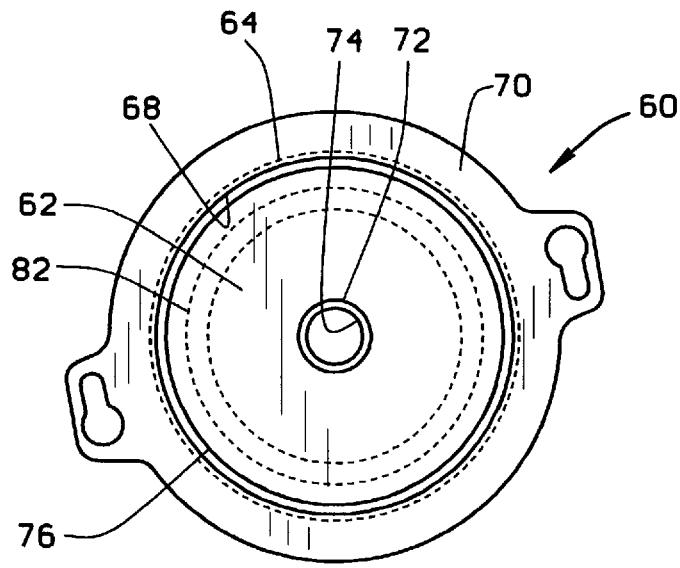
FIG. 5 is a right end view of the motor housing.
Figure 6:
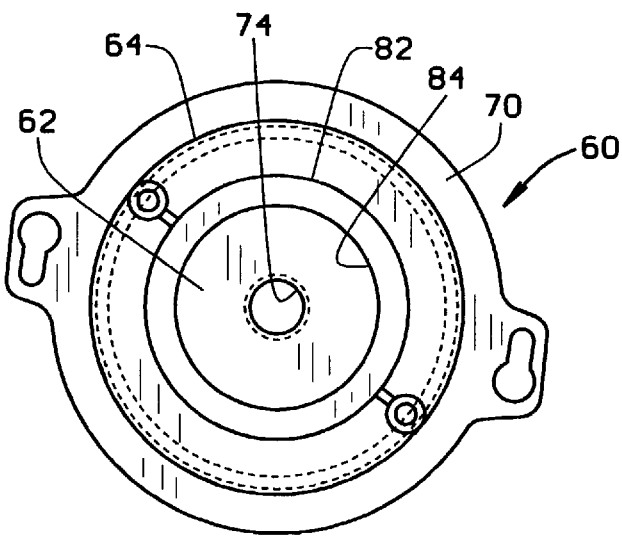
FIG. 6 is a left end view of the motor housing.

In the preferred embodiment, the end wall 62, the cylindrical outer wall 64, and the cylindrical unit bearing tower 72 are integrally cast. As shown in FIG. 4, the cylindrical outer wall 64 may also include an inwardly directed annular step 76 on its interior surface between the end wall 62 and the distal end 66 of the cylindrical outer wall 64. The step 76 provides positive axial positioning and support for the stator core 42 within the motor housing 60. As shown in FIGS. 1 and 2, the motor housing 60 may also include a cover 78 mounted to the exterior of the motor housing 60 for housing a starting switch, capacitor, or relay.

As shown in FIGS. 3–6, the motor housing 60 also includes a generally cylindrical body 82 extending axially from the end wall 62 in the opposite direction from the cylindrical outer wall 64. The cylindrical body 82 extends from an annular portion of the end wall 62 between the center portion and the annular periphery of the end wall. The cylindrical body 82 defines a cavity 84 which is configured to receive a portion of the fuel pump 26 when the pump is coupled to the rotor shaft 46 of the electric motor 40 by the coupling 32. The interior of the cavity 84 communicates with the axial bore 74 in the unit bearing tower 72.

The side wall 14 of the burner housing 12 is provided with an opening 16 configured to mate with the open end 68 of the motor housing 60. As shown in FIG. 3, the motor housing 60 is mounted to the burner housing 12 with the open end 68 in register with the opening 16 in the side wall 14 of the burner housing 12, thereby joining the interior of the motor housing 60 with the interior of the burner housing 12.

The open end 68 of the motor housing 60 and the opening 16 in the side wall 14 of the burner housing 12 are dimensioned to permit air from the interior of the burner housing 12 to flow over the stator winding 86. As best shown in FIG. 8, the electric motor 40 is preferably mounted within the motor housing 60 with at least a portion of the stator winding 86 extending axially beyond the open end 68 of the motor housing 60 and into the interior of the burner housing 12.

As shown in FIGS. 3, 7 and 8, the squirrel cage blower wheel 50 is mounted to the rotor shaft 46 substantially concentric with the stator core 42 and stator winding 86. The blower wheel 50 preferably extends at least partially along the axial length of the stator winding 86 and circumscribes at least a portion of the stator winding 86 (see FIGS. 7 and 8). During operation of the burner 10, cool intake air is moved past the stator winding 86 as it is drawn into the center 52 of the blower wheel 50, thereby resulting in increased cooling of the motor.

Although the present invention has been described herein by reference to a specific embodiment and a particular use, the advantages of the present invention are not limited to the field of fluid fuel burners. It should be understood that the present invention could be used in connection with any system requiring an electric motor to be mounted to a unit which houses a blower fan. Other configurations of the present invention could be constructed, and different uses could be made, without departing from the scope of the invention as set forth in the following claims.

What is claimed is:

1. A motor housing for use in supporting a motor adjacent a side wall opening in a fuel burner side wall, said motor housing comprising:

an end wall having an annular periphery; and a generally cylindrical outer wall extending axially from the periphery of said end wall and terminating at a distal end, the distal end being configured for mounting said motor housing to a fuel burner side wall adjacent an opening in the side wall, the distal end of said cylindrical outer wall defining a first opening which is in register with the side wall opening when said motor housing is mounted to the fuel burner side wall.

2. The motor housing of claim 1 wherein the first opening and side wall opening are dimensioned to permit fluid communication between an interior of the fuel burner and an interior of said motor housing when said motor housing is mounted to the fuel burner side wall.

3. The motor housing of claim 1 wherein said motor housing is configured to support an electric motor having a stator winding, and wherein diameters of the first opening and side wall opening are at least as large as a diameter of the stator winding.

4. A motor housing for use in supporting a motor adjacent a side wall opening in a fuel burner side wall, said motor housing comprising:

an end wall having an annular periphery; and a generally cylindrical outer wall extending axially from the periphery of said end wall and terminating at a distal end, the distal end being configured for mounting said motor housing to a fuel burner side wall adjacent an opening in the side wall, the distal end of said cylindrical outer wall defining an opening;

said motor housing being configured to support an electric motor having a stator winding so that at least a portion of the stator winding extends axially beyond the distal end of said cylindrical outer wall, through the opening, and through the opening of the fuel burner side wall when said motor housing is mounted to the fuel burner side wall.

5. The motor housing of claim 4 wherein said cylindrical outer wall is integral with said end wall.

6. The motor housing of claim 4 wherein the distal end of said cylindrical outer wall includes a flange for mounting said motor housing to the fuel burner side wall.

7. The motor housing of claim 6 wherein the flange extends radially outwardly from said cylindrical outer wall of said motor housing.

8. The motor housing of claim 4 wherein said cylindrical outer wall has an interior surface with an inwardly directed annular step between said end wall and the distal end of said cylindrical outer wall for supporting the motor.

9. The motor housing of claim 4 wherein said motor housing further comprises a cylindrical unit bearing tower integral with said end wall, said cylindrical unit bearing tower extending axially from a center portion of said end wall into said motor housing substantially concentric with said cylindrical outer wall.

10. The motor housing of claim 9 wherein said unit bearing tower includes an axial bore configured to receive at least a portion of a rotor shaft of the electric motor so that the rotor shaft is freely rotatable relative to said unit bearing tower.

11. The motor housing of claim 9 wherein said cylindrical outer wall, said end wall, and said cylindrical unit bearing tower are integrally cast.

12. A motor for use with a conventional fuel burner having a fuel burner housing, the motor comprising:

a motor housing including an end wall having an annular periphery, and a generally cylindrical outer wall extending axially from the periphery of said end wall and terminating at a distal end, the distal end being configured for mounting said motor housing to the fuel burner housing; and a stator winding mounted within said motor housing;

wherein the distal end of said cylindrical outer wall defines a first opening which is in register with a second opening in the fuel burner housing when said motor housing is mounted to the fuel burner housing.

13. The motor of claim 12 wherein the first and second openings are dimensioned to permit fluid communication between an interior of the fuel burner housing and an interior of said motor housing when said motor housing is mounted to the fuel burner housing.

14. The motor of claim 13 wherein at least a portion of said stator winding extends axially beyond the distal end of the cylindrical outer wall, through the first and second openings, and into the fuel burner housing when said motor housing is mounted to the fuel burner housing.

15. The motor of claim 13 wherein said motor housing includes a cylindrical unit bearing tower integral with said end wall, said unit bearing tower extending axially from a center portion of said end wall into said motor housing substantially concentric with said cylindrical outer wall.

16. The motor of claim 15 further comprising a rotor core rotatable within said stator winding, and a rotor shaft secured for rotation with said rotor core, a portion of said rotor shaft extending into an axial bore in the unit bearing tower so that the rotor core is freely rotatable relative to the unit bearing tower.

17. The motor of claim 13 further comprising a generally cylindrical blower wheel mounted to the rotor shaft substantially concentric with the stator winding, said blower wheel extending at least partially along an axial length of the stator winding and circumscribing at least a portion of the stator winding.

18. A motor driven fuel burner comprising:

a motor housing having an end wall with an annular periphery, and a generally cylindrical outer wall extending axially from the periphery of the end wall and terminating at an annular distal end, the annular distal end defining a first opening; and a fuel burner housing having a side wall with a second opening, wherein said motor housing is mounted to the side wall of said fuel burner housing so that the first and second openings are in register with one another, thereby joining an interior of said motor housing with an interior of said fuel burner housing.

19. The motor driven fuel burner of claim 18 further comprising an electric motor mounted within said motor housing, wherein at least a portion of said electric motor extends axially beyond the distal end of the cylindrical outer wall, through the first and second openings, and into the interior of said fuel burner housing.

20. The motor driven fuel burner of claim 19 wherein said electric motor includes a stator winding mounted within said motor housing, a rotor core rotatable within the stator winding, and a rotor shaft secured for rotation with the rotor core, and wherein said motor driven fuel burner further comprises a generally cylindrical blower wheel mounted to the rotor shaft substantially concentric with the stator winding, said blower wheel extending at least partially along an axial length of the stator winding and circumscribing at least a portion of the stator winding.

\* \* \* \* \*